United States Patent
Handman et al.

[11] Patent Number: 5,799,972
[45] Date of Patent: Sep. 1, 1998

[54] INFLATOR FOR INFLATING AN AIR BAG HAVING MAGNETICALLY COUPLED INTERNAL IGNITION

[75] Inventors: Daniel F. Handman, Petaluma, Calif.; Kenneth E. Rahl, Romeo, Mich.

[73] Assignee: TRW Vehicle Safety Systems Inc., Lyndhurst, Ohio

[21] Appl. No.: 635,364

[22] Filed: Apr. 19, 1996

[51] Int. Cl.$^6$ .................. B60R 21/26; B60R 21/32
[52] U.S. Cl. .................. 280/735; 280/737; 280/741; 102/209; 222/3
[58] Field of Search .................. 280/737, 736, 280/741, 742, 740, 735; 102/209, 206, 530, 531; 222/3; 137/68.13

[56] References Cited

U.S. PATENT DOCUMENTS

| | | | |
|---|---|---|---|
| 2,459,854 | 1/1949 | Swift, Jr. | 102/209 |
| 3,229,582 | 1/1966 | Schlie | 102/209 |
| 3,770,387 | 11/1973 | Loomba | 280/736 |
| 4,049,935 | 9/1977 | Gruber | 280/736 |
| 4,350,096 | 9/1982 | Cannavo et al. | 102/209 |
| 5,134,306 | 7/1992 | Schumacher et al. | 280/735 |
| 5,227,577 | 7/1993 | Eich et al. | 102/209 |
| 5,348,344 | 9/1994 | Blumenthal et al. | 280/737 |

FOREIGN PATENT DOCUMENTS 1235844  6/1971  United Kingdom .................. 102/206

*Primary Examiner*—Peter C. English
*Attorney, Agent, or Firm*—Tarolli, Sundheim, Covell, Tummino & Szabo

[57] ABSTRACT

A pressure vessel (12) contains a source of inflation fluid for inflating an inflatable vehicle occupant protection device (11). The pressure vessel (12) includes a surface (52) which defines a passage (54) for inflation fluid to flow from the pressure vessel (12) into the inflatable vehicle occupant protection device. A device (68 and/or 96) inside the pressure vessel (12) sends or receives electrical signals. An energy transmitting device (70) transmits energy into or out of the pressure vessel (12) through a wall portion (24) of the pressure vessel (12). The energy transmitting device (70) includes a first portion (72) outside the pressure vessel (12) and a second portion (74) inside the pressure vessel (12). One of the first and second portions (72, 74) of the energy transmitting device (70) converts the energy into electrical current. The second portion (74) of the energy transmitting device (70) is electrically connected with the device inside the pressure vessel (12). In one embodiment, the device inside the pressure vessel (12) is a squib (68) which is actuated by electrical current to cause inflation fluid to flow from the pressure vessel (12).

6 Claims, 3 Drawing Sheets

INFLATOR FOR INFLATING AN AIR BAG HAVING MAGNETICALLY COUPLED INTERNAL IGNITION

TECHNICAL FIELD

The present invention relates to an inflator for inflating an inflatable vehicle occupant protection device, such as an air bag.

BACKGROUND ART

A known apparatus for use in inflating an inflatable vehicle occupant protection device, such as an air bag, includes a pressure vessel containing inflation fluid under pressure. The inflation fluid comprises a combustible mixture of gases. An initiator means is disposed in the pressure vessel. The initiator means is actuatable, upon the occurrence of a condition indicative of a vehicle collision for which air bag inflation is desired, to ignite the combustible gas in the mixture of gases. As the combustible gas burns, it heats the remaining gas in the pressure vessel and thereby increases the pressure of the gas in the pressure vessel.

When the pressure level in the pressure vessel reaches a predetermined elevated level, a burst disk which is blocking the gases from flowing out of the pressure vessel ruptures. The rupture of the burst disk creates an opening through which the gases can flow out of the pressure vessel toward the air bag to inflate the air bag.

Typically, the initiator means includes a squib, which is located inside the pressure vessel. The squib is actuated by passing an electrical current through the squib. When actuated, the squib produces combustion products which ignite the combustible gas in the pressure vessel. Because the squib requires electrical energy to actuate it, any electrical leads that carry electrical current to the squib from an external power source must extend through the wall of the pressure vessel. Any opening in the wall of the pressure vessel which accommodates any electrical lead, whether for carrying electrical current to a squib or for carrying electrical current into or out of the pressure vessel for any reason, can provide a leakage path for the pressurized inflation fluid in the pressure vessel.

SUMMARY OF THE INVENTION

The present invention is an apparatus comprising an inflatable vehicle occupant protection device and a pressure vessel containing a source of inflation fluid for inflating the inflatable vehicle occupant protection device. The pressure vessel includes surface means, which defines a passage for inflation fluid to flow from the pressure vessel into the inflatable vehicle occupant protection device, and a wall portion.

The apparatus further comprises a device inside the pressure vessel which sends or receives signals. The apparatus also includes an energy transmitting means associated with the device -inside the pressure vessel for transmitting energy into the pressure vessel. The energy transmitting means includes a first portion outside the pressure vessel and a second portion inside the pressure vessel. The first and second portions transmit energy through the wall portion of the pressure vessel without electrical leads extending through the wall portion. One of the first and second portions of the energy transmitting means converts the energy into electrical current. The second portion of the energy transmitting means is electrically connected with the device inside the pressure vessel.

The energy transmitting means preferably comprises a transformer. The first portion of the energy transmitting means is a primary winding and the second portion of the energy transmitting means is a secondary winding. The device inside the pressure vessel preferably comprises an initiator means which is actuated by electrical current for causing inflation fluid to flow from the pressure vessel.

In accordance with an alternate embodiment of the present invention, the apparatus includes a microprocessor inside the pressure vessel. The microprocessor is electrically connected to the device and to the second portion of the energy transmitting means. The device inside the pressure vessel includes at least one sensor operatively coupled to the microprocessor. The microprocessor monitors the sensor and controls transmission of data from the sensor out of the pressure vessel.

In accordance with another alternate embodiment of the present invention, the apparatus includes a plurality of actuators which actuate to release the inflation fluid. The actuators, which include the initiator means, are controlled by and operatively coupled to the microprocessor.

Brief Description of the Drawings The foregoing and other objects and features of the present invention will become apparent to one skilled in the art to which the present invention relates upon consideration of the following description of the invention with reference to the accompanying drawings, in which.

Description of a Preferred Embodiment

Figure 1:
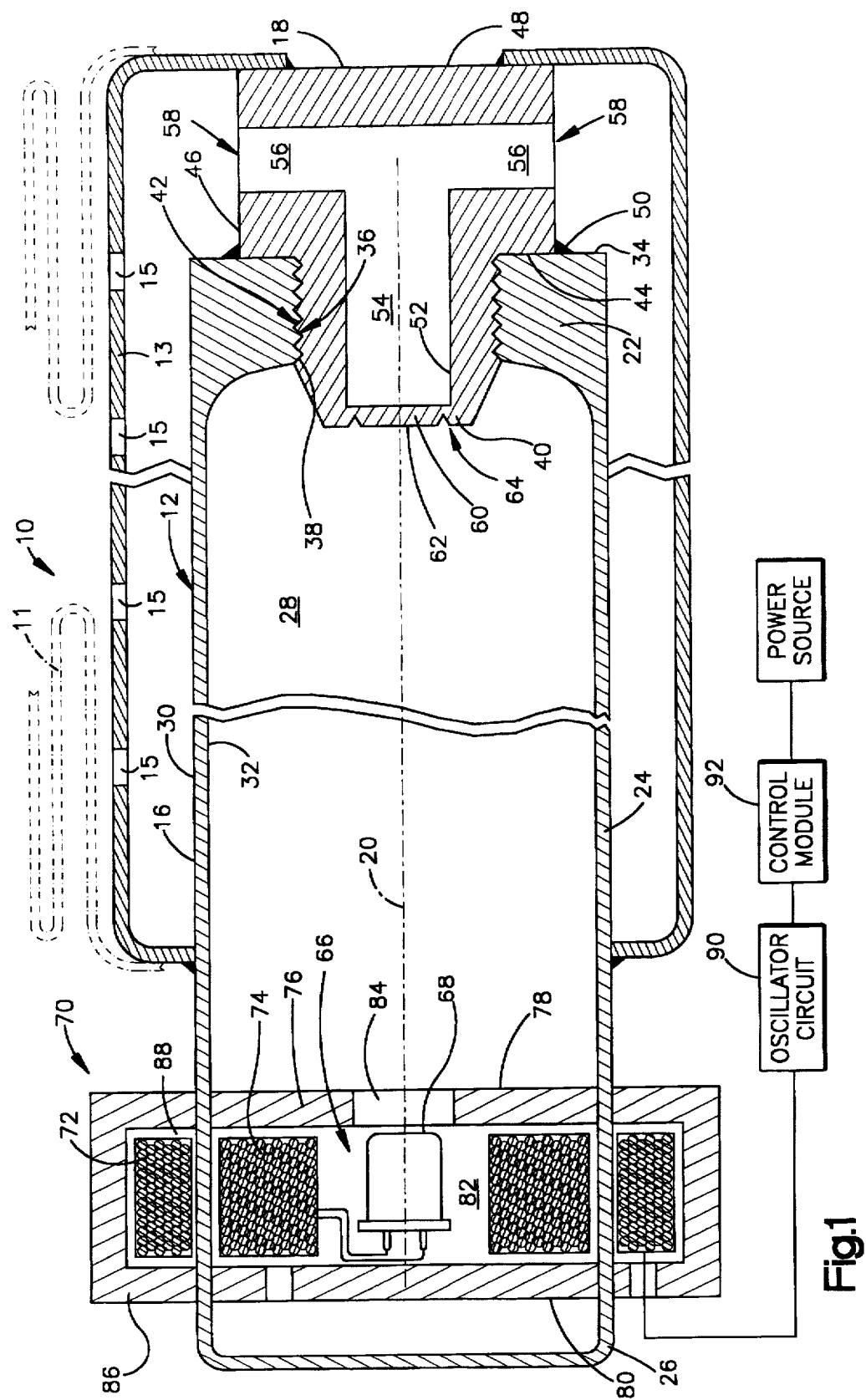
FIG. 1 is a schematic illustration of an inflator assembly constructed in accordance with the present invention.

Referring to FIG. 1, an inflator assembly 10 provides inflation fluid for inflating an inflatable vehicle occupant protection device, such as an air bag 11. The inflator assembly 10 comprises a pressure vessel 12. The pressure vessel 12 comprises a container member 16 and a plug member 18. Both the container member 16 and the plug member 18 are made of a non-ferrous material, such as aluminum. The air bag 11 is attached to an annular diffuser 13 which has a plurality of gas outlet openings 15. The diffuser 13 is attached to the exterior of the inflator assembly 10.

The container member 16 has a longitudinal axis 20 and includes a first end portion 22, a cylindrical wall portion 24, and a second end portion 26. The cylindrical wall portion 24 interconnects the first and second end portions 22, 26 of the container member 16. The first and second end portions 22, 26 and the wall portion 24 define a chamber 28 for storing inflation fluid to inflate the air bag. The cylindrical wall portion 24 has an outer surface 30 and an inner surface 32.

The second end portion 26 of the container member 16 is closed. The first end portion 22 includes an outer radially extending surface 34 and an axially extending surface 36 which intersects with the radially extending surface 34. The axially extending surface 36 defines an opening 38 in the first end portion 22 of the container member 16. The opening 38 is centered about the axis 20. The surface 36 which defines the opening 38 is threaded.

The chamber 28 contains a source of inflation fluid preferably comprising a combustible mixture of gases. The combustible mixture of gases includes a primary gas, which comprises the majority of the gas for inflating the air bag 11, and a combustible gas which, when ignited, heats the primary gas. The primary gas preferably includes an oxidizer gas for supporting combustion of the combustible gas, and an inert gas for inflating the air bag 11. The primary gas may include air or a mixture of air and an inert gas. The inert gas may be nitrogen, argon or a mixture of nitrogen and argon. Preferably, the primary gas is air and the oxidizer gas is the oxygen in the air.

The combustible gas may be hydrogen, methane, or a mixture of hydrogen and methane. Preferably, the combustible gas is hydrogen. A typical composition of the mixture of gases is about 12% hydrogen by volume and 88% air by volume. The mixture of gases is stored in the chamber 28 at a pressure of approximately 2,500 psi, but could be stored at a different pressure.

The plug member 18 is annular and is centered about the axis 20. The plug member 18 includes a closure wall 40 at one end and a threaded outer surface portion 42 that extends axially away from the closure wall. The outer surface portion 42 terminates at a first radially extending surface 44 that extends radially outward from the surface portion 42 to an axially extending surface 46. The axially extending surface 46 terminates at a second radially extending surface 48 that is spaced axially apart from the first radially extending surface 44 and that represents the end of the plug 18 opposite the closure wall 40.

The plug member 18 is screwed into the first end portion 22 of the container member 16 with the outer surface portion 42 engaging the threaded axially extending surface 36. The first radially extending surface 44 abuts the radially extending surface 34 of the container member 16. The joint between the plug member 18 and the container member 16 is sealed by an annular weld 50.

An inner axially extending surface 52 of the plug member 18 defines an axial passage 54 centered about the axis 20 inside the plug member 18. The closure wall 40 extends radially across the axial passage 54 to block inflation fluid inside the chamber 28 from flowing into the axial passage 54. A circumferentially disposed plurality of radial passages 56 in the plug member 18 communicate with the axial passage 54. The radial passages 56 terminate in a corresponding plurality of openings 58 in the axially extending surface 46.

The closure wall 40 has a predefined breakaway section 60. The breakaway section 60 has a first surface 62 which faces the inside of the container member 16 and thus becomes an inside surface of the pressure vessel 12. An annular V-shaped groove 64 in the first surface 62 circumscribes the breakaway section 60.

When the chamber 28 is filled with inflation fluid as described above, the pressure of the stored mixture of gases acts axially outward against the first surface 62 of the breakaway section 60 of the closure wall 40. The ambient air pressure outside the pressure vessel 12 acts axially inward on the breakaway section 60 of the closure wall 40. As a result, the breakaway section 60 is subjected to a pressure differential. Since the pressure of the stored mixture of gases is higher than the ambient air pressure, the pressure differential results in a pressure force urging the breakaway section 60 to move axially outward, into the axial passage 54 and away from the chamber 28. The V-shaped groove 64 in the first surface 62 of the breakaway section 60 is a stress riser which will rupture when the pressure force reaches a predetermined level.

An initiator means 66 is located in the chamber 28 of the pressure vessel 12 near the second end portion 26. The initiator means 66 comprises a squib 68 which is actuated by electrical energy to produce combustion products.

A transformer 70 transmits electrical energy to the squib 68. The transformer comprises a primary winding 72 and a secondary winding 74. The secondary winding 74 is ring-shaped and is supported inside the container member 16 adjacent the second end portion 26 of the container member 16 by an annular support member 76 as schematically shown in FIG. 1. The support member 76 has a first wall 78 and a second wall 80 connected by axially extending rib members (not shown). The first and second walls 78, 80 of the support member 76 are secured to the inner surface 32 of the wall portion 24 of the container member 16, preferably by an interference fit.

The secondary winding 74 is located between the first and second walls 78 and 80 of the support member 76. The outer circumference of the secondary winding 74 is held close to the inner surface 32 of the wall portion 24 of the container member 16 by the support member 76. The inner circumference of the ring-shaped secondary winding 74 defines a cylindrical space 82 inside the secondary winding 74 in which the squib 68 is mounted. The secondary winding 74 and the squib 68 are electrically connected. The first wall 78 has an aperture 84 which provides fluid communication between the space 82 and the portion of chamber 28 located to the right of space 82 in FIG. 1.

The primary winding 72 of the transformer 70 is ring-shaped and is located outside of the pressure vessel 12 adjacent the second end portion 26 of the container member 16. The primary winding 72 is supported outside the pressure vessel 12 by an annular support member 86. The annular support member 86 is securely held against the outer surface 30 of the wall portion 24 of the container member 16, preferably by an interference fit. The primary winding 72 is located in an annular cavity 88 of the support member 86. The inner circumference of the primary winding 72 is held in close radial proximity to the outer surface 30 of the wall portion 24 of the container member 16. The annular support member 86 is positioned axially such that the primary winding 72 outside the pressure vessel 12 is radially aligned with the secondary winding 74 inside the pressure vessel 12. Thus, the primary and secondary windings 72 and 74 are separated by the wall portion 24 of the container member 16. There are no electrical leads which extend through the wall portion 24 to connect the primary and secondary windings 72 and 74 electrically.

The primary winding 72 is electrically connected to an oscillator circuit 90. A control module 92 is electrically connected between the oscillator circuit 90 and a power source, such as the vehicle's DC battery. Further, the control module 92 is electrically connected to a collision sensor (not shown) which provides a signal to the control module 92 to energize the oscillator circuit 90 in the event of a condition indicative of a collision requiring deployment of the air bag 11.

When the vehicle experiences a condition indicative of a collision for which inflation of the air bag 11 is desired, the control module 92 causes the oscillator circuit 90 to generate an AC signal from the DC battery voltage and send the AC signal to the primary winding 72. A magnetic field is created by the primary winding 72 from the AC signal sent by the oscillator circuit 90. The magnetic field created by the primary winding 72 passes through the wall portion 24 of the container member 16 and induces electrical current in the secondary winding 74. Thus, electrical current is provided inside the pressure vessel 12 without electrical leads extending through the wall portion 24 of the container member 16. The electrical current is passed through the squib 68 and actuates the squib 68. The squib 68, when actuated, produces combustion products which are dispersed through the aperture 84 into the chamber 28 containing the combustible mixture of gases.

Combustion products from the squib 68 contain a sufficient amount of heat and hot particles to ignite the combustible gas in the mixture of gases in the chamber 28. When the combustible gas burns in the chamber 28, it generates heat which increases the temperature and pressure of the gas in the chamber 28. The gas pressure differential across the breakaway section 60 of the closure wall 40 increases with the increasing pressure inside the chamber 28. When the gas pressure differential reaches a predetermined elevated level, the resulting pressure force acting axially outward against the first surface 62 of the breakaway section 60 reaches a corresponding predetermined elevated force level. The material of the closure wall 40 then ruptures at the V-shaped groove 64 under the stress caused by the pressure force.

When the material of the closure wall 40 ruptures at the V-shaped groove 64, the breakaway section 60 separates from the closure wall 40 and is pushed axially outward from the closure wall 40 through the axial passage 54 of the plug member 18 to the opposite end of the axial passage. An opening through the closure wall 40 is created by the separation of the breakaway section 60. The opening has a circular shape and diameter matching the shape and diameter of the separated breakaway section 60. The inflation gas flows through the opening in the closure wall 40 and axial passage 54 and into the plurality of radial passages 56 in the plug member 18. The plurality of radial passages 56 direct the inflation gas through the corresponding plurality of openings 58. The inflation gas flows from the openings 58 into the air bag 11.

The inflator assembly 10 is protected from accidental ignition due to electrostatic fields as the non-ferrous material used to make the pressure vessel 12 will block out any electrostatic fields. As an additional safeguard, the secondary winding 74 of the present invention can be tuned to a specific frequency so that only alternating magnetic fields of a specific oscillator circuit frequency will actuate the initiator means 66. This tuning of the secondary winding 74 protects the inflator assembly 10 from accidental actuation of the initiator means 66 by stray magnetic fields.

Figure 2:
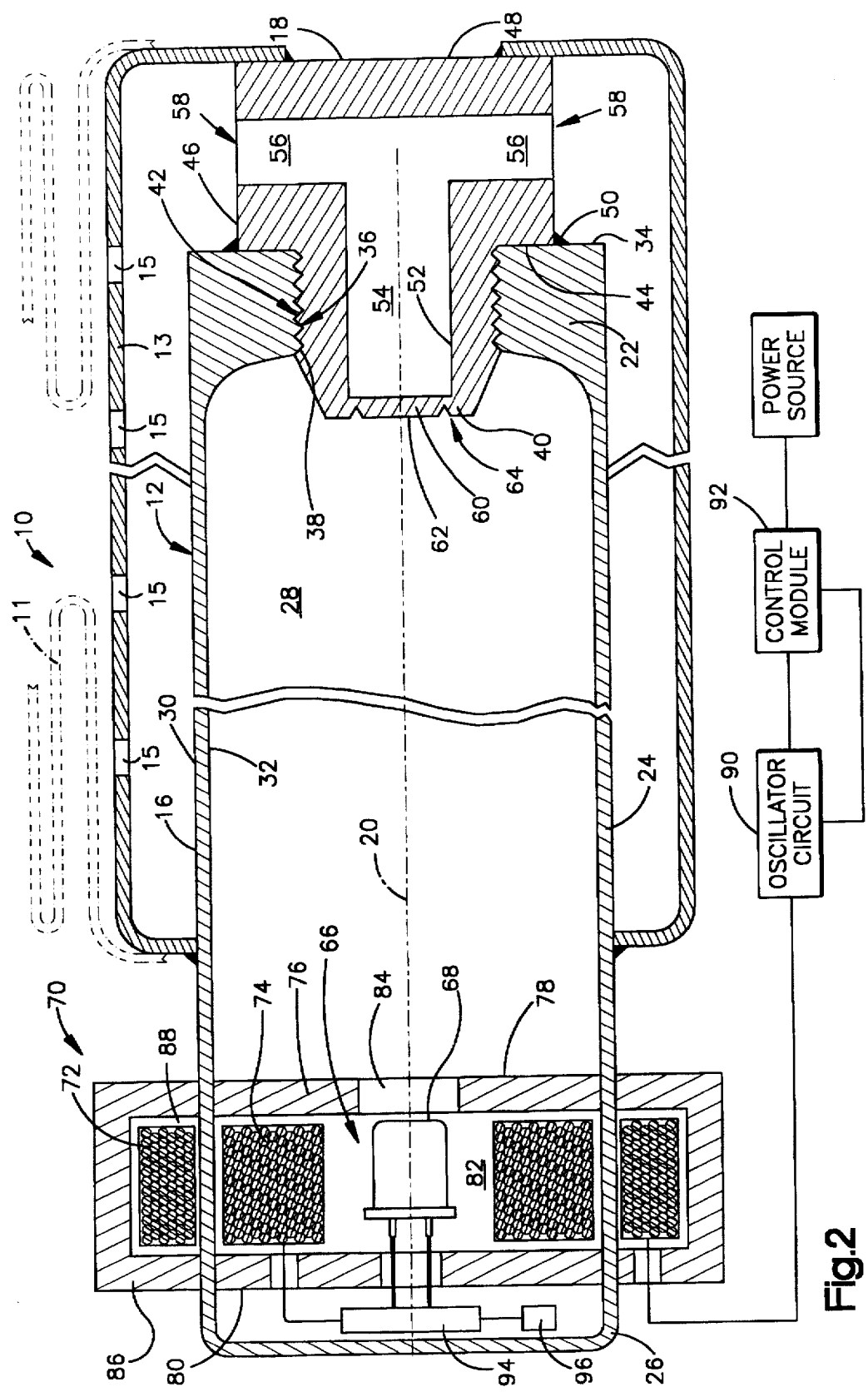
FIG. 2 is a schematic illustration of an alternate embodiment of an inflator assembly constructed in accordance with the present invention.

An alternate embodiment of the present invention is shown in FIG. 2. In the embodiment of FIG. 2, reference numbers similar to those of the embodiment of FIG. 1 are used to designate parts similar to the parts of FIG. 1. In the alternate embodiment shown in FIG. 2, a microprocessor 94 is located in the pressure vessel 12 adjacent the second end portion 26 of the pressure vessel 12. The microprocessor 94 is electrically connected between the secondary winding 74 and the initiator means 66. The microprocessor 94 is used to control the actuation of the initiator means 66.

In addition, the microprocessor 94 monitors sensors, such as a pressure sensor 96 located inside the pressure vessel 12. The microprocessor 94 includes a high frequency transmitter for sending data from the sensor 96 to a receiver in the control module 92 outside the pressure vessel 12. When data from the sensor 96 is desired, a magnetic field is established between the primary and secondary windings 72, 74 of the transformer 70 as previously described. The magnetic field provides electrical current of a given first magnitude to the microprocessor 94 inside the pressure vessel 12. The microprocessor 94 is programmed to respond to current at the given first magnitude by monitoring the sensor 96. Accordingly, the microprocessor 94 acquires electrical signal data from the sensor 96 and controls the transmission of the signal data out of the pressure vessel 12. The transmitted data is carried by the low frequency electrical current provided by the transformer 70. The sensor data is received and processed by the control module 92 outside the pressure vessel 12.

The microprocessor 94 is further programmed to respond to current at a given second magnitude to (i) provide current to the squib 68, thereby initiating inflation of the air bag 11, and to (ii) monitor the sensor 96. Thus, the pressure level inside the pressure vessel 12 can be monitored under normal conditions and during the inflation process.

Figure 3:
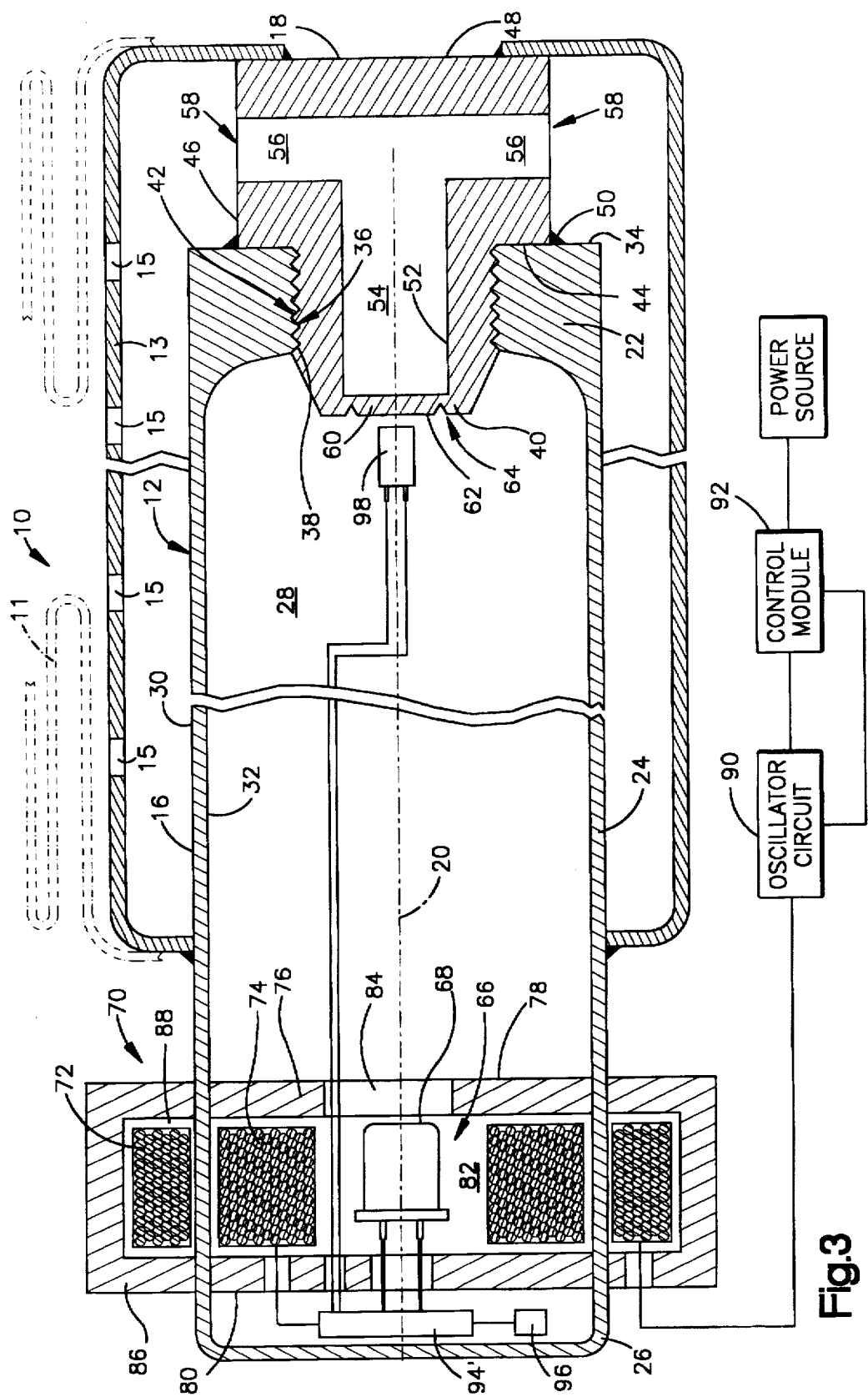
FIG. 3 is a schematic illustration of another embodiment of an inflator assembly constructed in accordance with the present invention.

Another alternate embodiment of the present invention is shown in FIG. 3. In the embodiment of FIG. 3, reference numbers similar to those of the embodiment of FIG. 2 are used to designate parts similar to the parts of FIG. 2. In this alternate embodiment, the microprocessor 94' inside the pressure vessel 12 is used to control multiple initiator means. As shown in FIG. 3, a second initiator means 98 inside the pressure vessel 12 is located adjacent the breakaway section 60 of the closure wall 40. The second initiator means 98 is electrically connected to the microprocessor 94'.

In the event that inflation of the air bag 11 is desired, the microprocessor 94' directs electrical current from the secondary winding 74 to the second initiator means 98. Upon receiving the electrical current, the second initiator means 98 ignites and causes the closure wall 40 to rupture, allowing the gases to begin flowing out of the chamber 28 and into the air bag 11. At a predetermined time subsequent to actuating the second initiator means 98, the microprocessor 94' directs electrical current to the initiator means 66, thereby actuating the squib 68. The squib 68 produces combustion products which in turn ignite the combustible gas in the mixture of gases contained in the chamber 28. The ignited gas burns and generates heat and pressure in the chamber 28. The gases contained in the chamber 28 flow out of the pressure vessel 12 and into the air bag 11. In this embodiment, the inflation of the air bag 11 occurs at first in a gradual manner when squib 98 is actuated, and then rapidly when squib 68 is ignited.

From the above description of the invention, those skilled in the art to which the present invention relates will perceive improvements, changes and modifications. For example, the chamber 28 could contain a source of inflation fluid comprising an inert gas and a non-gaseous heat generating material, as is known in the art. Also, the initiator means 66 could comprise a device inside the pressure vessel 12 which creates a spark across a gap between two parts, rather than the squib 68, to ignite the combustible mixture of gases in the chamber 28. Further, the combustible gas and/or the oxidizer gas could be stored in separate containers and be mixed together upon actuation of the initiator means 66. Such improvements, changes and modifications within the skill in the art are intended to be covered by the appended claims.

Having described the invention, the following is claimed:

1. An apparatus comprising:

an inflatable vehicle occupant protection device;

a pressure vessel containing a source of inflation fluid for inflating said inflatable vehicle occupant protection device, said pressure vessel including surface means for defining a passage for inflation fluid to flow from said pressure vessel into said inflatable vehicle occupant protection device and having a wall portion;

a device inside said pressure vessel which sends or receives signals;

energy transmitting means for transmitting energy into said pressure vessel, said energy transmitting means including a first portion outside said pressure vessel and a second portion inside said pressure vessel, said first and second portions transmitting energy through said wall portion of said pressure vessel without electrical leads extending through said wall portion, one of said first and second portions of said energy transmitting means converting said energy into electrical current;

said second portion of said energy transmitting means being operatively coupled with said device inside said pressure vessel; and a microprocessor inside said pressure vessel, said microprocessor being operatively coupled to said device and to said second portion of said energy transmitting means.

2. The apparatus as defined in claim 1 wherein said device further includes at least one sensor operatively coupled to said microprocessor, said microprocessor monitoring said sensor and controlling the transmission of data from said sensor out of said pressure vessel.

3. An apparatus comprising:

an inflatable vehicle occupant protection device;

a pressure vessel containing a source of inflation fluid for inflating said inflatable vehicle occupant protection device, said pressure vessel including surface means for defining a passage for inflation fluid to flow from said pressure vessel into said inflatable vehicle occupant protection device and having a wall portion;

a device inside said pressure vessel which sends or receives signals;

energy transmitting means for transmitting energy into said pressure vessel, said energy transmitting means including a first portion outside said pressure vessel and a second portion inside said pressure vessel, said first and second portions transmitting energy through said wall portion of said pressure vessel without electrical leads extending through said wall portion, one of said first and second portions of said energy transmitting means converting said energy into electrical current;

said second portion of said energy transmitting means being operatively coupled with said device inside said pressure vessel, said device inside said pressure vessel comprising an initiator means which is actuated by electrical current for causing inflation fluid to flow from said pressure vessel; and a microprocessor inside said pressure vessel;

said initiator means being one of a plurality of initiator means which actuate to release the inflation fluid, said plurality of initiator means being controlled by, and operatively coupled to, said microprocessor.

4. An apparatus for use in inflating an inflatable vehicle occupant protection device, said apparatus comprising:

a pressure vessel containing a source of inflation fluid for inflating an inflatable vehicle occupant protection device, said pressure vessel including surface means for defining a passage for said inflation fluid to flow from said pressure vessel into said inflatable vehicle occupant protection device;

said pressure vessel being made of a non-ferrous material and having a wall portion;

at least one initiator means inside said pressure vessel which is actuated by electrical current for causing inflation fluid to flow from said pressure vessel;

a transformer having a primary winding and a secondary winding, said primary winding being located outside said pressure vessel and said secondary winding being located inside said pressure vessel;

said secondary winding being operatively coupled with said at least one initiator means; and a microprocessor inside said pressure vessel operatively coupled to said secondary winding.

5. The apparatus as defined in claim 4 further including a sensor inside said pressure vessel, said microprocessor monitoring said sensor and controlling the transmission of data from said sensor out of said pressure vessel.

6. An apparatus for use in inflating an inflatable vehicle occupant protection device, said apparatus comprising:

a pressure vessel containing a source of inflation fluid for inflating an inflatable vehicle occupant protection device, said pressure vessel including surface means for defining a passage for said inflation fluid to flow from said pressure vessel into said inflatable vehicle occupant protection device;

said pressure vessel being made of a non-ferrous material and having a wall portion;

at least one initiator means inside said pressure vessel which is actuated by electrical current for causing inflation fluid to flow from said pressure vessel;

a transformer having a primary winding and a secondary winding, said primary winding being located outside said pressure vessel and said secondary winding being located inside said pressure vessel;

said secondary winding being operatively coupled with said at least one initiator means;

said at least one initiator means comprising a plurality of initiator means which actuate to release the inflation fluid; and a microprocessor inside said pressure vessel, said plurality of initiator means being controlled by, and operatively coupled to, said microprocessor.

* * * * *